No. 64,948.  
PATENTED MAY 21, 1867.

A. CORNELL.  
COMBINED GRAIN THRESHER AND CLEANER.

2 SHEETS—SHEET 1.

Witnesses:  
Inventor:

No. 64,948.
A. CORNELL.
COMBINED GRAIN THRESHER AND CLEANER.
PATENTED MAY 21, 1867.
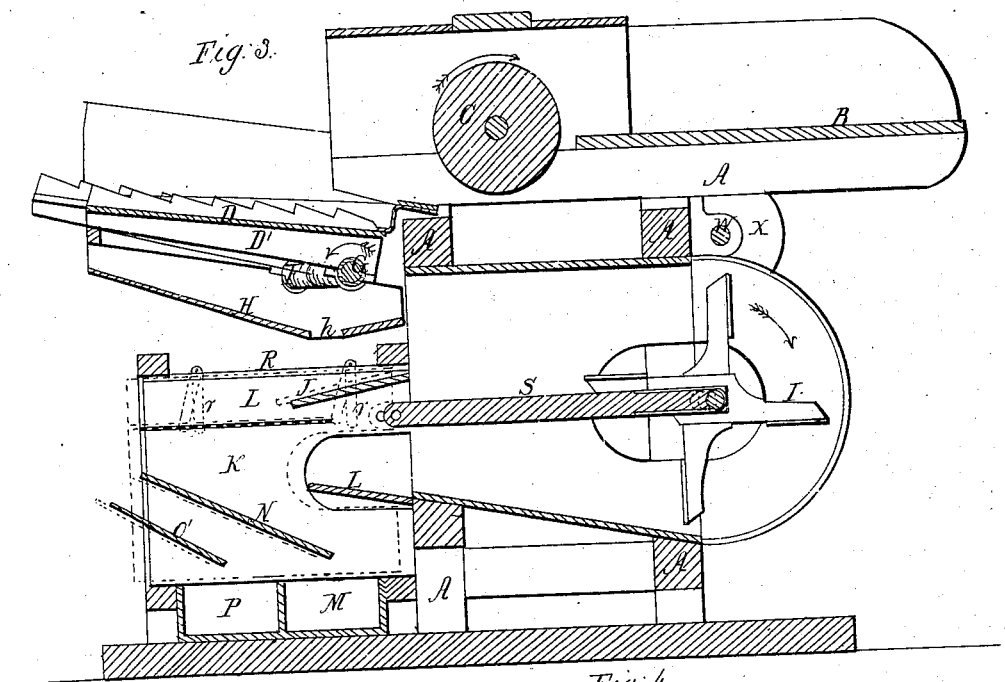
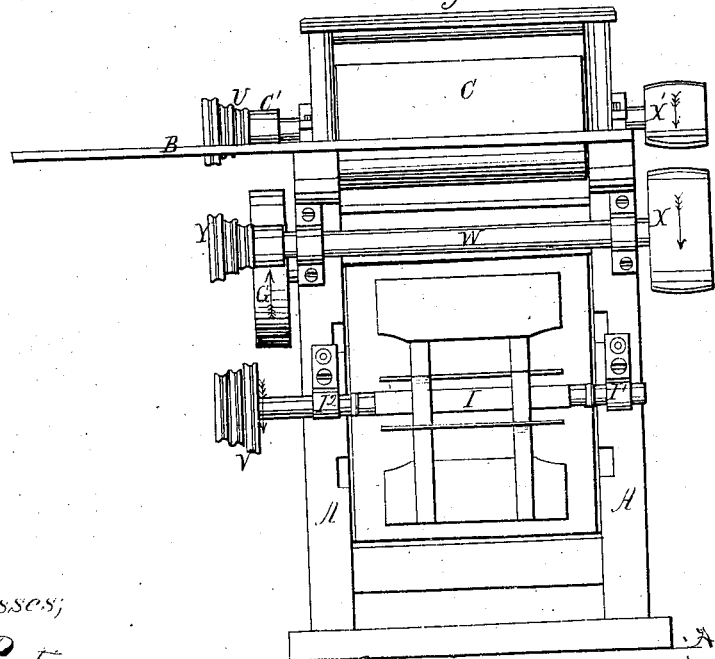

United States Patent Office.

ADRIAN CORNELL, OF NEWTOWN, PENNSYLVANIA.

Letters Patent No. 64,948, dated May 21, 1867.

COMBINED GRAIN-THRESHER AND CLEANER.

*The Schedule referred to in these Letters Patent and making part of the same.*

TO ALL WHOM IT MAY CONCERN:

Be it known that I, ADRIAN CORNELL, of Newtown, in the county of Bucks, and State of Pennsylvania, have invented certain new and useful improvements in Combined Grain-Threshers and Cleaners; and I do hereby declare that the following is a full, clear, and exact description of the same, reference being had to the accompanying drawings, making part of this specification, in which—

Figure 1:
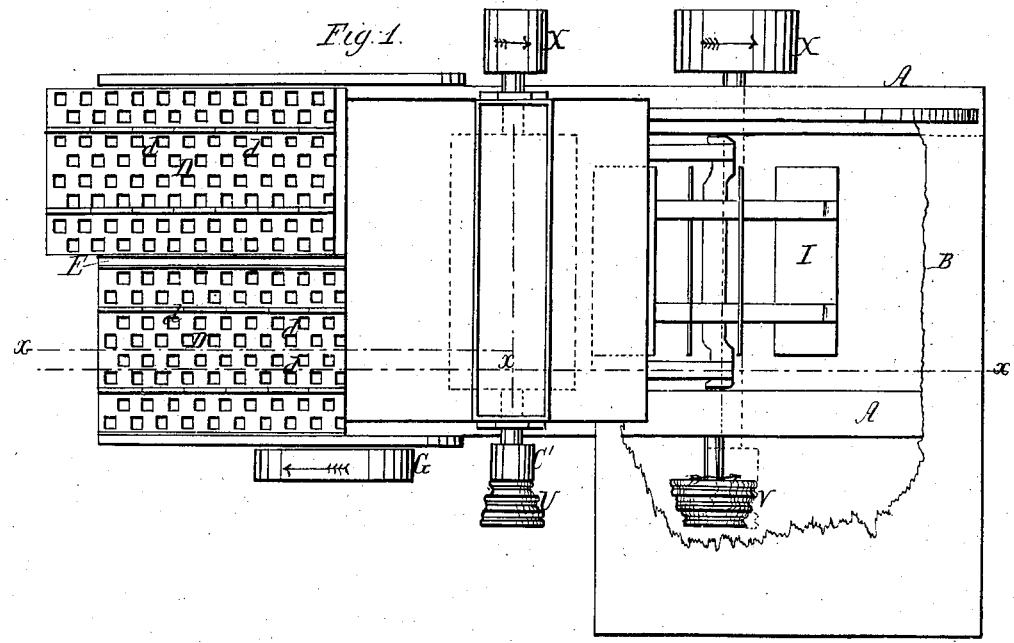

Figure 1 is a plan or top view of a combined thresher and cleaner embracing my improvements.

Figure 2:
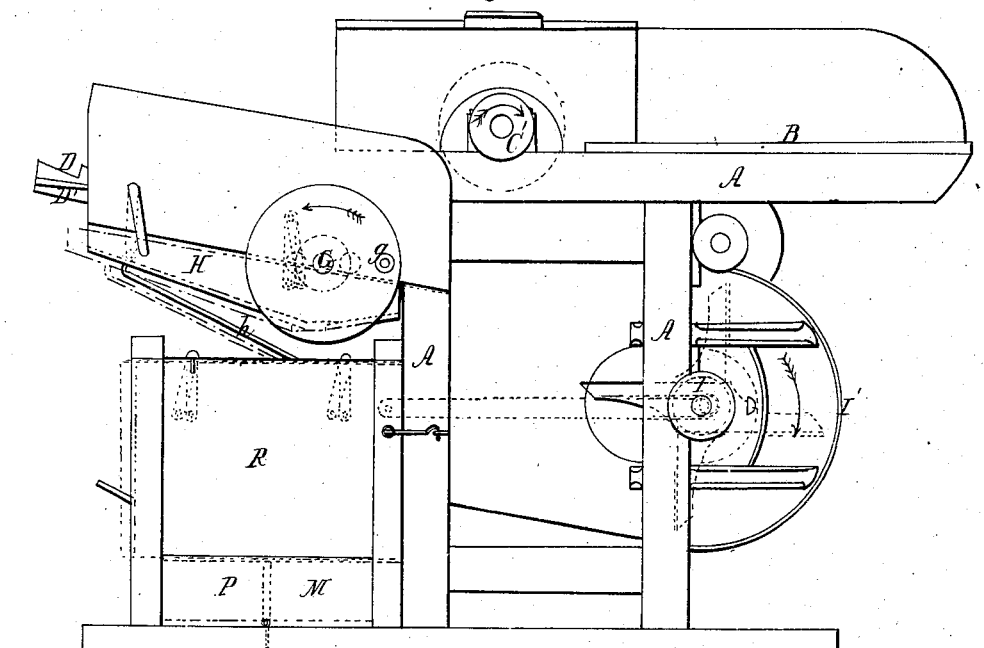

Figure 2, a side elevation of the same.

Figure 3, a vertical longitudinal section through the same at the line $x\ x$ of fig. 1; and Figure 4, a view in elevation of the same, as seen from the front, with the fan case removed.

It is the object of my improvements both to separate the grain from the straw, and to clean the grain in the most thorough manner by the same operation; and my invention consists, first, in a novel mode of combining the threshing cylinder and fan with the shaker or straw-carrier; second, in a novel mode of constructing the winnower so as to render it detachable from the other parts; third, in a novel mode of returning the threshed grain to the fan; fourth, in a novel arrangement of the driving mechanism.

In the accompanying drawings the main portion of the mechanism is shown as mounted in a strong frame, A. The sheaves are fed from a table, B, sidewise to a threshing cylinder, C, armed with spikes, and having a suitable concave. The threshed grain and straw are thrown from the cylinder upon a shaker or conveyor, consisting of two perforated screens or riddles, D, divided by a vertical stationary partition, E, and having a longitudinal and vertical movement communicated to them in alternately opposite directions by means of the double cranks F, on the conveyor-shaft G, the cranks turning in bearings in ribs D', on the under side of the conveyor, which ribs slide in grooves in the frame. By this means an alternate vibratory motion is given to the straw (in its backward movement on the central partition E, which greatly assists in separating the kernels from the straw. The conveyor finally drops the straw from the back of the machine. The kernels drop through the perforations $d$, of the screens D, into the shaking-hopper H, being exposed to a strong blast from the fan I in falling, to carry off the chaff, which is blown out at the back of the machine. The kernels pass from the shaking-hopper through an opening, $h$, in its bottom, near its forward end, and fall upon a cant-board, J, in the shaking-shoe K. This board slopes backward, in order to deposit the grain on a horizontal screen, L, also attached to the shaking-shoe, where it is exposed to another blast from the fan. Any grain which may fall upon the board L, which is fixed in the shoe-frame, and consequently does not vibrate, will be blown off upon the cant-board N. The heavier kernels fall down the cant-board N into the front drawer M, while those lighter kernels which may be blown over the upper end of this board will fall upon the second board, O, and be conveyed to the rear drawer P, thus separating kernels of different specific gravities. The cant-boards N O and screen L are attached to a shaking-shoe, K, suspended by links $r$ from a shoe-frame, R, and vibrated longitudinally by connecting-rods S, from the shaft of the fan, which is cranked at each end for that purpose. This shoe or screen-frame R is independent of the main frame, being merely connected therewith by hooks $r'$, as shown in fig. 2, and consequently can readily be detached by unfastening these hooks and the connecting-rods S, which vibrate it. The shaking-hopper H is vibrated from the shoe by a link, $h'$. The fan-shaft is mounted in boxes I', mortised into, and screwed upon, the front of the frame, and the front of the fan case I¹ is provided with tenons, which are inserted into corresponding mortises in the frame. By this mode of construction the fan and shaking-shoe can easily be removed or replaced, thus enabling me to use the machine as a separator only, or as a separator and cleaner. When used as a separator only the hopper H is stationary, and the grain may either be retained in it, or fall through it into a suitable receptacle. The machine may be driven by a crank, $g$, on the shaker-shaft G, and have a pulley, G', on it, to drive the cylinder-shaft by a corresponding pulley, C', and a band encircling the two. Under this arrangement the fan is driven by a band from the cylinder-shaft, which is provided with a series of cone pulleys, U, to match a corresponding series, V, on the fan-shaft, and thus regulate the speeds of the respective parts. In order to drive by power I also provide a driving-shaft, W, turning in proper boxes on the front of the frame. This shaft has a large pulley, X, on one end to match a similar one, X', on the corresponding end of the cylinder-shaft, and a series of smaller pulleys, Y, on the opposite end. By this arrangement I am enabled to drive the machine from either an undershot or overshot horse-power, without crossing the driving-belt, which crossing produces much unnecessary friction and wearing of the belt. When driven by power the band from the power passes over the pulleys X X', driving with them the pulleys Y, and, through these pulleys Y, driving either the pulleys Y on the fan-shaft, or the pulleys G' on the shaker-shaft, as may be desired, the pulleys U being, in either case, driven by the pulley X.

What I claim as my invention, and desire to secure by Letters Patent, is—

1. The combination, substantially as described, of the threshing cylinder, the double vibrating shaker, the fan, and the shaking-shoe, when arranged for joint operation, as set forth.

2. The detachable shoe-frame R, constructed and arranged as described.

3. The combination of the shaker, the shaking-hopper, and the riddle, arranged for joint operation, as described.

4. The combination of the driving-shaft and pulleys with the cylinder-shaft and pulleys, and the pulleys on the fan-shaft, arranged and operating as described, for the purpose of adapting the machine to use with either an undershot or overshot horse-power, without crossing the belts.

In testimony whereof I have hereunto subscribed my name.

ADRIAN CORNELL.

Witnesses:
M. E. JENKS,